(12) United States Patent
Huttunen et al.

(10) Patent No.: US 7,949,357 B2
(45) Date of Patent: May 24, 2011

(54) METHOD AND APPARATUS TO SELECT COLLABORATING USERS IN SPECTRUM SENSING

(75) Inventors: Anu Huttunen, Helsinki (FI); Niko Kiukkonen, Veikkola (FI); Visa Koivunen, Espoo (FI)

(73) Assignee: Nokia Corporation, Espoo (FI)

( * ) Notice: Subject to any disclaimer, the term of this patent is extended or adjusted under 35 U.S.C. 154(b) by 703 days.

(21) Appl. No.: 12/001,623

(22) Filed: Dec. 11, 2007

(65) Prior Publication Data

US 2009/0149208 A1    Jun. 11, 2009

(51) Int. Cl.
H04B 7/00        (2006.01)
H04W 72/00    (2009.01)

(52) U.S. Cl. .................. 455/509; 455/450; 455/452.1
(58) Field of Classification Search .............. 455/502, 455/41.1, 426.1, 509, 450, 452.1
See application file for complete search history.

(56) References Cited

U.S. PATENT DOCUMENTS

| | | | |
|---|---|---|---|
| 6,768,721 B1 | 7/2004 | Schmitz et al. | 370/248 |
| 7,408,907 B2 * | 8/2008 | Diener | 370/338 |
| 7,424,268 B2 * | 9/2008 | Diener et al. | 455/62 |
| 7,620,396 B2 * | 11/2009 | Floam et al. | 455/434 |
| 2004/0028003 A1 * | 2/2004 | Diener et al. | 370/319 |
| 2008/0095042 A1 | 4/2008 | McHenry et al. | 370/217 |
| 2008/0137634 A1 * | 6/2008 | Hassan et al. | 370/343 |
| 2008/0159208 A1 | 7/2008 | Kloker et al. | 370/329 |
| 2008/0261537 A1 | 10/2008 | Chen | 455/68 |
| 2009/0054095 A1 | 2/2009 | Corke et al. | 455/509 |
| 2009/0247201 A1 | 10/2009 | Ye et al. | 455/509 |

FOREIGN PATENT DOCUMENTS

| | | |
|---|---|---|
| CN | 1829385 A | 9/2006 |
| GB | 2431548 A | 4/2007 |
| GB | 2447148 A | 9/2008 |
| KR | 20070041343 A | 4/2007 |
| WO | WO-2007/094604 A1 | 8/2007 |

OTHER PUBLICATIONS

Chia-Han Lee et al. "Multiple Access-Inspired Cooperative Spectrum Sensing for Cognitive Radio," Oct. 29, 2007, pp. 1-6, XP031232378.
Hyoungsuk Jeon et al. "Notification Protocol of Sensing Information in Cognitive Radio System," Sep. 21, 2007, pp. 1377-1380, XP031261523.

(Continued)

*Primary Examiner* — Tilahun Gesesse
(74) *Attorney, Agent, or Firm* — Harrington & Smith

(57) ABSTRACT

In a first time interval TI a first frequency band FB is pseudorandomly selected from a designated spectrum, and a first analysis result is determined by sensing the first FB during the first TI and then transmitted. In a second TI a second FB is pseudorandomly selected from the designated spectrum, and a second analysis result is determined by sensing the second FB during the second TI and then transmitted. Where multiple devices do this the entire spectrum is sensed, each band by a subset of devices that changes at each TI, and so any unused or underutilized spectrum is searched by the collaborative spectrum sensing, which avoids propagation problems such as fading. Also, a central node can assure various collaborating users report different FBs in different TIs such that the subset of reporting users changes for at least one of the bands in each subsequent reporting TI. Sensing and communication can be performed in different portions of the same network defined transmission time interval.

31 Claims, 3 Drawing Sheets

OTHER PUBLICATIONS

Paulo Marques et al. "Sensing Opportunities in UMTS spectrum," Aug. 1, 2007, pp. 492-496, XP031276097.

Tao Luo et al. "Maximum Likelihood Ratio Spectrum Dectedtion Model for Multicarrier Modulation Based Cognitive Radio Systems," Sep. 1, 2007, pp. 1698-1701, XP031147697.

Ghurumuruhan Ganesan et al. "Spatiotemporal Sensing in Cognitive Radio Networks," Sep. 1, 2007, pp. 1-5, XP031168098.

Ganesan G et al. "Agility improvement through cooperative diversity in cognitive radio," Nov. 28, 2005, pp. 2505-2509.

Carlos Cordeiro et al., "IEEE 802.22: The First Worldwide Wireless Standard Based On Cognitive Radios", IEEE International Symposium On New Frontiers In Dynamic Spectrum Access Networks, Nov. 8, 2005, pp. 328-337, XP010855130.

Hatkin, S., "Cognitive Radio: A look into the future of wireless communications and engineering challenges presented by its implementation", Apr. 2006, McMaster University, 12 pgs.

Laskar, J., et al., "Reconfigurable RFICs and Modules for Cognitive Radio", © 2006, IEEE, pp. 283-286.

Yang, J., et al., "Addressing the Dynamic Range Problem in Cognitive Radios", © 2007, IEEE, pp. 5183-5188.

Luu, L., et al., An Adaptive Weaver Architecture Radio with Spectrum Sensing Capabilities to Relax RF Component Requirements, © 2007, IEEE, pp. 538-545.

Jarmo Lunden et al., "Censoring for Collaborative Spectrum Sensing in Cognitive Radios", Proc. Of the 41$^{st}$ Asilomar Conference on Signals, Systems, and Computer, Pacific Grove, CA, USA, Nov. 4-7, 2007, 6 pgs.

* cited by examiner

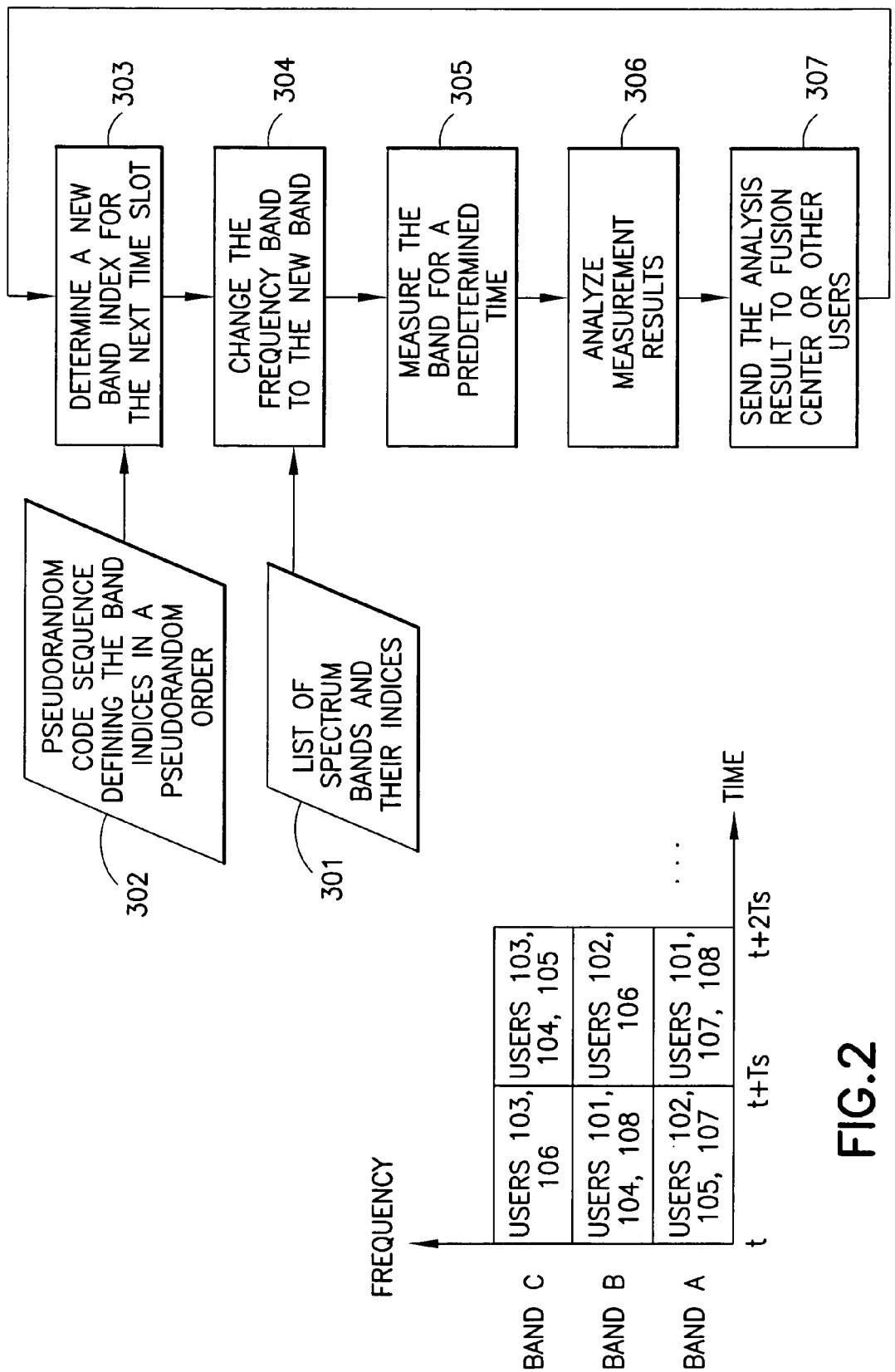

METHOD AND APPARATUS TO SELECT COLLABORATING USERS IN SPECTRUM SENSING

TECHNICAL FIELD:

The teachings herein relate generally to wireless networks and devices operating in such networks, and are particularly related to sensing spectrum used in the network such as to avoid interference or otherwise manage spectrum usage. These teachings are applicable to hierarchical as well as ad hoc wireless networks.

BACKGROUND

Spectrum sensing is needed in cognitive radios to find empty slots in the radio spectrum which can subsequently be used in an opportunistic manner. The cognitive radio must be able to detect a primary user at a low power level and avoid causing interference to it. Generally it is assumed to use the actual mobile terminals operating within the network as the cognitive radios that also sense the spectrum quality. The spectrum sensing task can be enhanced by utilizing collaboration among users. Having many users analyze the same part of the spectrum simultaneously can result in an enhanced detection probability of low level signals when the results are merged. Similarly, having each individual user sense a smaller part of the spectrum at a given time instance would allow for using simpler and more power efficient spectrum sensing techniques, since each individual user need only sense a portion of the entire spectrum but if the information is properly managed each user benefits from the other users' spectrum measurements also. By using collaboration among the users, one can also avoid the so-called hidden node problem where the primary user cannot be detected by using a single terminal due to channel propagation effects such as shadowing or fading. The effects of propagation can be mitigated when multiple terminals in different locations are used for the spectrum sensing.

So the spectrum sensing task can in theory be shared among the various users in order to obtain savings in power consumption at the individual mobile users, to reduce the amount of data to be transmitted by those individual users, and consequently to facilitate the use of simpler sensing techniques in each individual user as compared to having individual terminals measure the entire spectrum in use across the network. One practical problem with collaboration is that the selection, control, and resultant handling of the collaborative nodes represent a control signaling overhead that occupies additional bandwidth because the collaborative nodes need to be controlled independently. Thus the potential spectrum savings by allocating bandwidth more efficiently in view of the spectrum sensing by the mobile terminals is offset, often more than offset, by the coordination required to get those mobile terminals to sense portions of the spectrum. This is particularly true when one tries to incorporate diversity into spectrum sensing so as to avoid the hidden node problem above.

There are not that many prior art systems known to the inventors. A first prior art approach to be considered is sensor networks where the communication of sensors is operating based on the random communications. In this first approach the sensor networks are not collaborating in the spectrum sensing phase. A second prior art approach that might be relevant is frequency hopping systems where the frequencies are utilized based on the beforehand agreed scheme. To avoid interference the frequency hopping systems generally impose some pseudo-randomness into the hopping pattern used by the individual mobile terminals. These frequency hopping schemes are used to determine the time and frequency slots for traffic though, and to the knowledge of the inventors are not employed for spectrum sensing purposes. Frequency hopping communication systems generally seek to avoid many users on the same band simultaneously so as to avoid collisions, whereas for sensing this is an advantage in that there is diversity gains and performance improvement by having multiple users sensing the same band simultaneously. Generally, a sensing system would be designed to result in collisions in a controlled manner, and so spectrum sensing systems are inherently different from frequency-hop based communication systems.

What is needed in the art is a way to sense a radio spectrum that is low in signaling overhead yet still measures the same spectrum from different locations at the same time so as to give the advantages of diversity. The practical constraints of any reasonable approach are that individual mobile terminals that may measure that spectrum quality have a limited power supply, and that spectrum sensing should not interfere with user data being transmitted in that same network for which the spectrum is being sensing and the measurement reports sent for compilation and more efficient deployment of that same radio spectrum.

SUMMARY

In accordance with one embodiment of the invention there is a method that includes pseudorandomly selecting from a designated spectrum a first frequency band in a first time interval, determining a first analysis result by sensing the first frequency band during the first time interval, transmitting the first analysis result, pseudorandomly selecting from the designated spectrum a second frequency band in a second time interval, determining a second analysis result by sensing the second frequency band during the second time interval, and transmitting the second analysis result. In an overall system wherein multiple devices execute this same method simultaneously so a to cover the entire designated spectrum, diversity is achieved when at least two of the devices at different physical locations are sensing the same frequency band at the same time, which occurs generally for each frequency band of the whole spectrum. The time interval may be an entire time slot or a portion of it, and in certain embodiments spectrum sensing is performed in a first portion of the slot and communications (such as sending/receiving user data or control signaling, or transmitting the analysis results) are performed in a second portion of the slot. In a particular embodiment, pseudorandomly selecting the frequency bands and sensing them is done over a finite number of frequency bands. Also in a particular embodiment, the sensing need not fully span a time interval dictated by a communication protocol (e.g., 2G/3G/3.9G/WLAN) but the first time interval above may be a portion of a frame or slot or other such network-defined transmission time interval. The user device can then communicate normally in the remainder of the network-defined transmission time interval (e.g., send uplink data, send an acknowledgement, etc.). This division itself may also be network-defined, so that a network defined transmission time interval includes a sensing time interval such as the first interval above, and a communication interval and an acknowledgement interval, for example (e.g., sub-slots of a TTI or frame or slot).

In accordance with another embodiment of the invention there is a device that includes a processor coupled to a memory and to a receiver and to a transmitter. The processor is adapted to pseudorandomly select from a designated spectrum a first frequency band in a first time interval and a second frequency band in a second time interval. The receiver is adapted to sense the first frequency band during the first time interval and to sense the second frequency band during the second time interval. The processor is adapted to determine a first analysis result for the sensed first frequency band and to determine a second analysis result for the second frequency band. The transmitter is adapted to transmit the first analysis result and to transmit the second analysis result.

In accordance with another embodiment of the invention there is a computer readable memory embodying a program of machine-readable instructions executable by a digital data processor to perform actions directed toward determining time and frequency parameters for sensing spectrum bands. In this embodiment the actions include pseudorandomly selecting from a designated spectrum a first frequency band in a first time interval, determining a first analysis result by sensing in the first frequency band during the first time interval, pseudorandomly selecting from the designated spectrum a second frequency band in a second time interval, and determining a second analysis result by sensing the second frequency band during the second time interval.

In accordance with another embodiment of the invention there is a method that includes receiving from N cognitive users first analysis results for frequency bands spanning a designated spectrum for a first time interval. Also is received, from the N cognitive users, second analysis results for frequency bands spanning the designated spectrum for a second time interval. In this embodiment, the analysis results for the first time interval for a first one of the frequency bands are from a different subset of the N cognitive users than the analysis results for the second time interval for the first one of the frequency bands. Further in the method, there is determined from the received analysis results that a portion of the designated spectrum is underutilized, and a transmission is caused to be sent over the determined underutilized portion.

In accordance with another embodiment of the invention there is a device that includes a receiver adapted to receive from N cognitive users first analysis results for frequency bands spanning a designated spectrum for a first time interval, and to receive from the N cognitive users second analysis results for frequency bands spanning the designated spectrum for a second time interval, wherein the analysis results for the first time interval for a first one of the frequency bands are from a different subset of the N cognitive users than the analysis results for the second time interval for the first one of the frequency bands. The device further includes a processor coupled to the receiver and configured to determine from the received first and second analysis results at least whether a portion of the designated spectrum is underutilized, in which case it can be used by the cognitive users.

These and other aspects of the invention are detailed more particularly below.

BRIEF DESCRIPTION OF THE DRAWINGS

The foregoing and other aspects of these teachings are made more evident in the following Detailed Description, when read in conjunction with the attached Drawing Figures.

FIG. 2 is a table delineating the subgroupings of FIGS. 1A-1B for the different bands and different time slots.

FIG. 3 is a process flow diagram according to an embodiment of the invention.

DETAILED DESCRIPTION

Figure 1B:
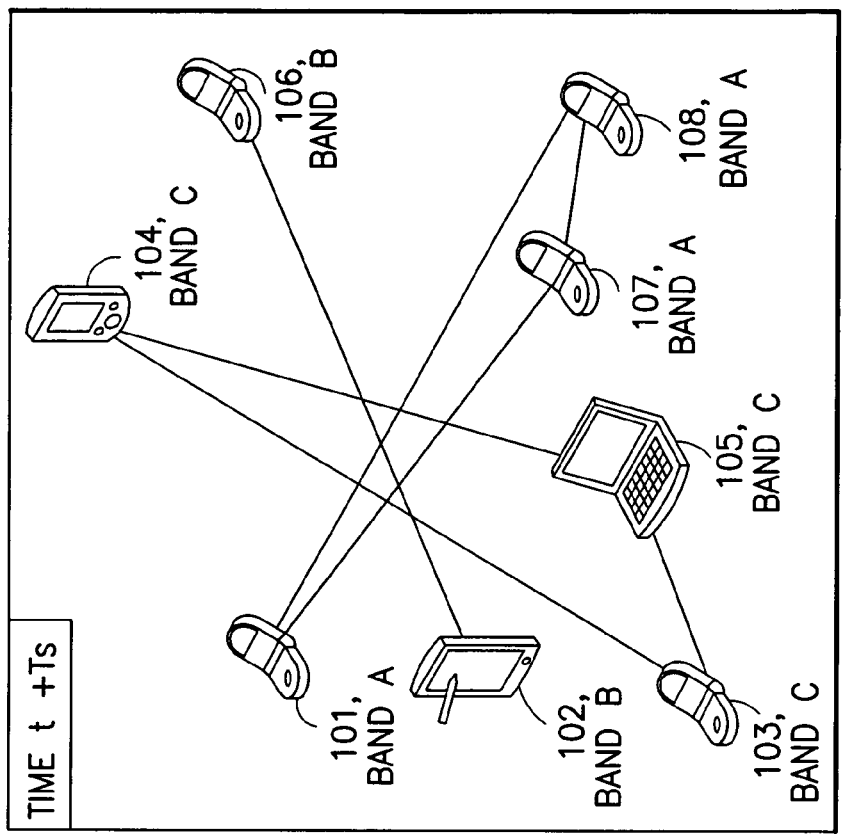
FIGS. 1A-1B illustrate constellations of terminals wherein different subsets of the terminals sense different portions of the spectrum at different time intervals.

Further to the problem formulated above, it is beneficial to implement a collaboration scheme where the terminals can select the frequencies and collaboration partners without the specific, centralized control messages for each individual collaboration node. This helps avoid consuming excessive amounts of system capacity with control signaling. In addition, the mobile users that are collaborating in the spectrum sensing task should be selected in a way that the diversity gains are obtained, i.e., the displacement among the users sensing the same part of the spectrum should be large enough for the signal to experience sufficiently different communication channels for the different cognitive users. The channel correlations should be small among the users to obtain the diversity gains. As can be seen, designing a sensing policy of the collaborating cognitive users for optimal coordination without high control signaling overhead is a demanding task when there are several cognitive users in the network. Frequency hopping is noted above as one prior art technique that distributes the mobile users among different portions of the spectrum at different times. The randomness of this frequency hopping is typically arranged by having a commonly agreed seed in both of the devices communicating with each other based on which the actual communication frequencies are selected.

The inventors have determined that not all of the mobile terminals in a system are always necessary for proper spectrum sensing. The term collaborating user is used herein to represent any individual subset of the users that senses the same frequency band at the same time and reports those sensed results to a central node or another mobile user that acts as coordinator among them for spectrum sensing purposes. The reporting results can also or alternatively be sent to each of the other collaborating users, such as for example if there is no central node or mobile user acting as coordinator. Embodiments of this invention relate to selecting the collaborating users in a pseudorandom manner such that the subset of collaborating users for each subset band of the overall spectrum (spectrum band) are formed and always changed after a certain period of time. That period of time is termed as a time slot in the description below, but time slot is not limited to only those networks whose protocols stipulate slot and apply for any generic time interval designated for the sensing, which advantageously is also a time interval used for traffic and control signaling in the network.

Designate N as the total number of cognitive users that are sensing spectrum in the wireless system within a considered area (e.g., within a cell). N is of course an integer greater than one in the minimum. Ideally there is a subset of those N users that will simultaneously sense the same portion of the spectrum that are geographically displaced from one another in order to exploit diversity of channel sensing. M represents a number of collaborative users, which is a subset of the N total users sensing spectrum in the system, who are simultaneously sensing a same part of the spectrum. In an embodiment, the number of collaborating users M for a particular band and timeslot is selected based on the operating frequency band $\Delta F$ and the total number of cognitive users N that are engaged in spectrum sensing, as well as the time granularity needed for the measurements. The selection of M and the time granularity may be made by a central node (e.g., a node B/base station of a traditional mobile telephony network or an access point of a wireless local area network) or by one of the users (e.g., in an ad hoc network). These decisions lead to design and allocation of a pseudorandom time-frequency code for each user. These codes determine which frequency band each user is sensing in each time instance.

The operation of individual nodes in the case of a different number of measuring nodes (M) can be designed a priori. It is desirable to design the codes so that at least two of the N cognitive users are sensing the same part of the spectrum during the same time slot; that is, at any given slot there are at least M=2 collaborating users for each frequency band. As a result, a diversity gain is obtained in the spectrum sensing, since the same part of the spectrum is sensed by different users at different locations. The subsets of users sensing a specific part of the spectrum change from one time slot to another based on the pseudorandom time-frequency code, and the number of collaborating users M for any of the frequency bands also may change from time slot to time slot. Consequently, there are different subsets of users sensing different parts of the spectrum at the same time. The subsets of users as well as the spectrum bands that are sensed by them are changed after a certain period of time, i.e. from one time slot to another in a pseudorandom manner. The channels that the users who sense a specific part of the spectrum experience may be different and exhibit low or no correlation because of the different locations of the users. Moreover, these channels may have low or no correlation with the channels the other members of the subset sensing the same part of the spectrum in the previous time slot were experiencing. Since a pseudorandom number sequence lacks any definite pattern, the constellation of the user terminals (e.g., the users in their respective locations) sensing the spectrum changes in a pseudorandom manner from one time slot to another. Consequently, the effects of propagation can be mitigated effectively. The spectrum sensing task for a specific spectrum band is shared with the users in the entire area of consideration. A poor choice of collaborating partners for a given frequency band (for example, collaborating users that experience the same channel) does not have a radical effect on the spectrum sensing results since the subsets and the sensing constellation will be different in different time slots.

Each cognitive user determines the spectrum band which it should be sensing, and consequently the subset of collaborating partners they belong to, using a pseudorandom sequence generator with an appropriate seed number, derived for example from time. In this manner control signaling overhead to coordinate the individual terminals is drastically reduced as compared to a hierarchical control of the individual terminals. As will be seen, the individual terminals may have no knowledge of the other terminals also sensing the same portion of the spectrum in the same time slot. In an embodiment, the pseudorandom sequence or a method to generate the sequence which determines which part of the spectrum an individual terminal is tasked to sense in each time slot (i.e. its individual frequency hopping pattern) is known by each user, for example by storing an algorithm to generate the sequence from the seed in a local memory of each user terminal. All terminals store the same algorithm and use (at any given time) a seed that sets the order of the frequency bands they will sense. Any central node also knows the seed and the algorithm, and can compute in advance what frequency band each individual ones of the N cognitive terminals will sense and report for each time slot. Thus, the need of centralized coordination of the spectrum sensing task is eliminated.

For the case of coordination by a central node or by one of the users, each user needs to know only its own frequency hopping pattern. This design of a spectrum sensing policy simplifies to designing the pseudorandom codes and allocating the codes to the cognitive radio users. The analysis result of the individual terminal's sensing (i.e., the observed data) can be computed decision statistics (e.g., likelihood ratios) or a binary decision (e.g., obtained by comparing a likelihood ratio to a predetermined threshold) which is sent to the central unit that is part of the network or reported to a coordinating terminal for the case of hierarchical networks, or it can be shared with the other cognitive users in the case of ad hoc networks. A decision about the availability of the free spectrum in the different frequency bands may then be made by the central unit or one of the users based on the received sensing results.

Figure 1A:
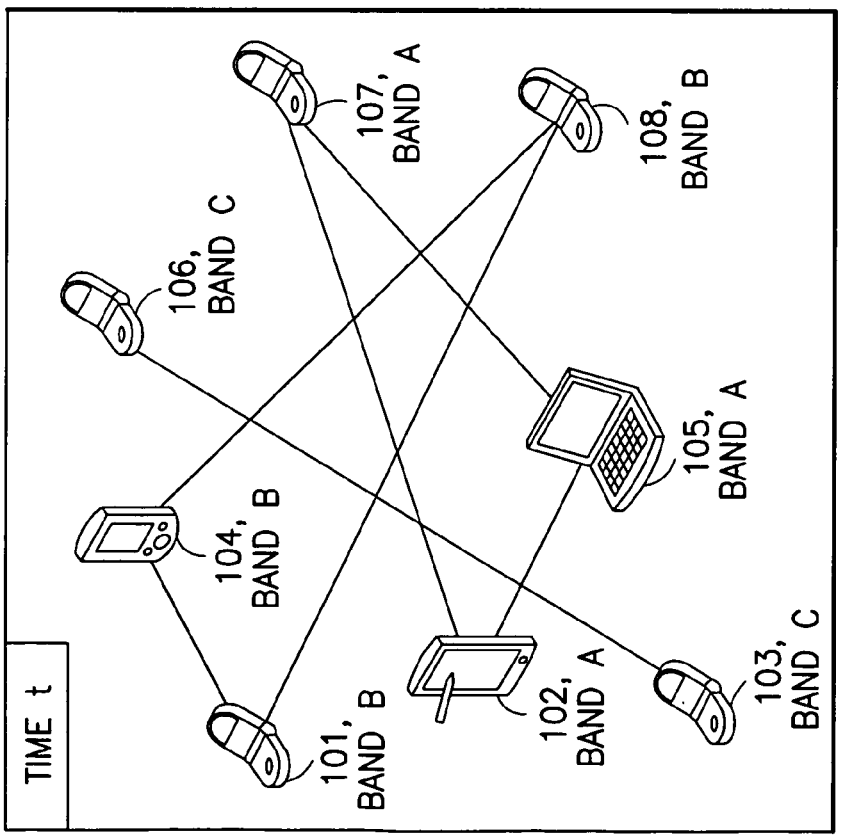

An embodiment of the invention is shown by the schematic diagrams of FIGS. 1A and 1B, which illustrate groupings of mobile stations for sensing purposes in each of a first time interval (t) and a second time interval (T+t). These intervals may be consecutive with no intervening other time slots, or may be spaced by some previously designated space that is preferably also measured as an interval number of intervening time intervals during which spectrum sensing is not undertaken. As above, there are N cognitive users in the network, and for FIGS. 1A-1B N=8 by example.

Regardless of what time interval is used for sensing purposes, in an embodiment the mobile stations do not transmit each and every one of the spectrum sensing results. For example, if the result of spectrum sensing is some test statistic value, then the mobile station can evaluate the value and determine whether or not to transmit it to the other cognitive users or to the central node as the case may be. Where the sensing mobile station determines that the test statistic value is not informative, there is no need to occupy bandwidth by transmitting it. This evaluation, whether or not to transmit the test statistic or other sensing result, may be a simple comparison of the determined test statistic against some predetermined fixed threshold or some dynamically controllable threshold. Further regarding the time interval in which the spectrum is sensed, the different time intervals at which any particular mobile station senses different frequency bands need not be identical in duration; one sensing result may be obtained in a short time whereas another may require a longer sensing duration. IF the analysis results are to be transmitted by the various cognitive users at a particular time instant, then for any individual cognitive user the analysis results are transmitted at a variable time after sensing (and any analysis) is complete since in different cases the sensing and analysis are of different time durations.

The spectrum to be analyzed with the spectrum sensing algorithm is assumed to be divided into spectrum bands with known bandwidths. The width of the entire spectrum to be analyzed is denoted by $\Delta F$. The spectrum can, for example, be divided into bands of equal widths $\Delta f$, but the bands need not be of equal width so long as each terminal knows in advance the bands that it may be called upon to sense and report. The number K of spectrum bands to be analyzed independently is then $K=\Delta F/\Delta f$. Since K is an integer, some rounding operation on the fraction may be needed in certain circumstances. In an embodiment, these K bands are indexed, and are denoted in FIGS. 1A-1B as band A, band B, and band C. The bands are mutually exclusive and together span the overall operating bandwidth in use at that cell/area of the network. Each cognitive terminal is assumed to be aware of the spectrum band bounds and their indices, and the N=8 individual cognitive terminals are designated the same across FIGS. 1A and 1B as 101 through 108.

The N cognitive users are designated to perform the spectrum sensing task in collaborative subsets for the various spectrum bands. The number of users M working collaboratively in each band can be determined, for example, by dividing the number N of cognitive users equally to all the bands M=N/K. The number M of collaborative users in each band can vary, and by the sequence generator approach generally will do so over most time slots at least. The band A can be analyzed in a particular timeslot by $M_A$ users, band B in that same particular timeslot by $M_B$ users and so on. There should be at least $M_{min}=2$ users for each band in a given time slot in order to fully obtain the diversity gains of the spectrum sensing algorithm.

The N cognitive users 101-108 performing spectrum sensing are designated for a particular spectrum band at a particular timeslot using a pseudorandom sequence generator. Thus each of the N=8 cognitive users 101-108 will change the frequency band it is observing in a pseudo-random way through all the bands A-C of interest at predetermined times known to all of the cognitive users. Hence, the pseudorandom sequences can be considered to be time-frequency codes where users hop to another part of the frequency band in each time slot. The net combination of the bands A-C are designated to be sensed by the combination of the N cognitive users (e.g., band A by collaborating subset $M_A$ of the N cognitive users, band B by collaborating subset $M_B$ of the N cognitive users, and so on). The particular pseudorandom sequence or its generator should be known to each cognitive user.

The breakdown of which users 101-108 sense which spectrum bands A-C in the first time slot (t) versus which of them report which spectrum in the second time slot (T+t) is shown in tabular form at FIG. 2. For the first time slot (t), there are $M_{A=3}$ collaborating users (102, 105, 107) sensing band A, $M_B=3$ collaborating users (101, 104, 108) sensing band B, and $M_c=2$ collaborating users (103, 106) sensing band C. After a certain time $T_s$, referred to as the second time slot (T+t), the users measuring the bands are changed in a pseudorandom manner. Now band A is being sensed by $M_{A=3}$ collaborating users (101, 107, 108), band B by $M_B=2$ collaborating users (102, 106), and band C by $M_c=3$ collaborating users (103, 104, 105), each at different locations as shown in FIGS. 1A-1B. Thus, each band is measured by a different group M of collaborating users at different time slots.

It is an advantageous aspect that the subset M of the N cognitive users sensing an individual band changes from slot to slot, and that the number M may vary from slot to slot for a given band. Note that in FIGS. 1A-1B and 2, band A is sensed by collaborating users 103 and 106 in the first time slot and by collaborating users 103, 104 and 105 in the second time slot. While user 103 overlaps in both of those sensing slots (t) and (T+t), this is a result of the random sequence generator that may happen from time to time, and is not seen as detrimental because the overall set of collaborating users sensing the same spectrum band A, B or C in different time slots is not identical from slot to slot. Note that for bands B and C there is no common collaborating user sensing the same band across slots (t) and (T+t). This illustrates the randomness, and is seen as particularly advantageous considering the minimal signaling overhead necessary once the individual users have the sequence generator algorithm stored.

FIG. 3 is a flow chart from the perspective of a single user that illustrates one possible embodiment of the invention. As is evident from the above, indexing the previously designated frequency bands and pseudorandomly generating an index number for each of the sensing slots as in FIG. 3 is but one implementation; others are possible with slightly more control signaling overhead. Any individual user will change the band it is sensing after each predetermined time slot of duration $T_s$ (though occasional exceptions are allowed as with user 103 for band C in FIGS. 1A-1B and 2 as noted above due to the randomness).

Specifically, at block 301 the user terminal stores in its local memory a list of spectrum bands and their indices. By examples, this may be provided in system information or some other broadcast information, or may be known a priori by the user terminals prior to even entering the subject cell/area such as published in a wireless protocol in use by the network. At block 302 the user terminal becomes a cognitive user and uses a pseudorandom code sequence to order the indices for the frequency bands in a pseudorandom manner. There are many ways this may be implemented. For example, a central node may send a message to the terminal giving it the seed and directing it to begin taking sensing measurements at a time certain; there may be a protocol whereby some operation on the user terminal's IMSI (international mobile subscriber identity) or part thereof (e.g., last few digits) or other identifier (e.g., a radio network temporary identifier) generates a result telling the terminal whether or not it is to sense network bands for sensing and reporting purposes. Such an operation can be given on a broadcast channel so the same users are not always tasked with this additional sensing and reporting. The pseudorandom code sequence may depend from the IMSI or part thereof, in which some results yield the indices (and so the user is a collaborating user and is to sense and report) and other results do not (indicating that user is not a collaborating user in that cell/area). The lowest signaling overhead is seen to be, for a hierarchical network, to have the users store an algorithm that depends from a seed, and the network to send the seed to individual users upon network entry. This designates that the users receiving the seed are designated collaborating users.

However these or various other implementations are used to generate the pseudorandom code sequences, the result at block 302 is that the indices of the different frequency bands are in a pseudorandom order. At block 303 the user determines that a new band index is needed for the next time slot for sensing purposes (which may be consecutive with the last sensed time slot or spaced T=qt by some integer multiple q of the time slot period t). The terminal accesses its local memory to determine the next index on the pseudorandom order from block 302, references at block 304 the band-to-index list also stored in its memory at 301, and at block 305 senses in that frequency band for a predetermined time. For that time slot the user is a collaborating user for the frequency band it sensed. At block 306 the terminal analyzes the sensed measurement results (and as above may also compare the analyzed results to a threshold to determine the binary state of the spectrum to report, such as used versus available) and at block 307 transmits that analysis result to a central node or another user terminal acting in a central node capacity or to all other user terminals.

The observed data from the sensed spectrum band can be analyzed at block 306 by the user using a spectrum sensing algorithm such as a cyclostationary feature detection, energy detection or likelihood test ratio. It can alternatively be sensed by a matched filter having its filter parameters matched to a known waveform that is expected to be present on the frequency band being sensed. Any of these can be used to generate a test statistic for the sensed spectrum. The analysis results at block 307 can be sent to a fusion center which analyses the combined results of the collaborating users for that band and slot as well as for other bands and slots for the other cognitive users, and makes a decision about which bands are being used and which bands are empty and may be used by cognitive radios. Alternatively, the cognitive users can send at block 307 the analysis results to other cognitive users, which can then merge the information from the other cognitive users to form a decision if there is unused spectrum available. The result which the individual cognitive users send to a fusion center or similar node can mean, for example, a binary decision determined by the cognitive user or a test statistic calculated by a specific spectrum sensing algorithm to mention a few.

The spectrum being sensed is for the purpose of more efficiently using the entire spectrum across the total N cognitive users, and so the most bandwidth gain is to find the 'holes' in the spectrum, those bands not currently in use by any of the N cognitive terminals or any other source, and put them to use. For this reason the spectrum sensing according to certain embodiments of this invention need not be a particularized channel quality measurement such as block error rate BLER or bit error rate BER, but may be simply sensing whether there is traffic within the designated spectrum band during the designated slot. A spectrum sensing algorithm locally stored in the terminal's memory then analyzes the sensed spectrum using techniques such as by cyclostationary feature detection or energy detection or matched filter to determine a test statistic such as a likelihood ratio of whether the energy sensed is traffic or only noise. This test statistic may be reported directly to the central node or other cognitive terminals, or to save further on signaling overhead only the binary decision (e.g., used/unused) may be reported by the individual ones of the N cognitive terminals for the spectrum band being sensed for that time slot. Any of these may be considered as the analysis results.

So by the embodiments of the invention given by example above, the effects of propagation such as fading and shadowing are effectively mitigated, since the constellation of users sensing a specific part of the spectrum (members of the subset of collaborating users M) changes periodically from one time slot to another in a pseudorandom manner, as illustrated at FIGS. 1A-1B. The channels that users experience in sensing the spectrum change when the locations where the sensing takes place change. Thus it is very likely that the channels are different or have a low correlation. The sensing constellation for any Kth band changes from one time slot to another. Hence, the location information of the M collaborating users is not necessarily needed to find good constellations and avoid the bad ones. The reporting can be as sparse as the binary decision of the analysis of the sensed spectrum band and the index of the band to which it applies. In certain embodiments even that index need not be reported, as the node B/central node can determine it knowing the IMSI or RNTI used by the reporting terminal in the algorithm to pseudorandomly arrange the band indices. For more robust reporting, still this technique avoids the need for the reporting terminals to add position information to their measurement sensing reports. Embodiments of this invention enables the determination of which users are to collaborate to sense a particular spectrum band during a specific timeslot to be performed in a decentralized way, thus eliminating or reducing the need for transmitting information about sensing policy between users. The complicated task of designing a sensing policy for multiple cognitive radios is changed to a simpler task of designing pseudorandom codes that determine the frequency hopping pattern and allocating these codes to the cognitive users. A low complexity terminal needs to know only its own frequency hopping pattern and forward the sensing results to the central unit or to other users.

The bands A, B, C that are collaboratively analyzed by the spectrum sensing scenario of this invention do not have to form a continuous band but the different parts of the spectrum to be sensed can be scattered in frequency, if needed.

It is noted that certain implementations of this invention require a pseudorandom sequence generator at each terminal, but this can be embodied in software and is a fairly straightforward and not a memory-intensive undertaking. That operation of all cognitive users needs to be synchronized in some way so that the spectrum sensing band is changed simultaneously is not seen to be a major shortfall as nearly all wireless systems rely on some common time tick for synchronizing other aspects of communications, even ad hoc networks which use contention based allocations of spectrum for traffic.

So in an embodiment of the invention from the individual terminal's perspective, the terminal pseudorandomly selects from a designated spectrum a first frequency band in a first time interval, determines a first analysis result by sensing the first frequency band during the first time interval, transmits the first analysis result, pseudorandomly selects from the designated spectrum a second frequency band in a second time interval, determines a second analysis result by sensing the second frequency band during the second time interval, and transmits the second analysis result. This pseudorandom selection is done by a plurality of such terminals simultaneously, so that all of the K bands are covered in each of the time intervals, which would generally extend beyond only two time intervals and continues until it is determined that spectrum sensing may no longer be needed. Each of the plurality of terminals pseudorandomly selects a frequency band in each time interval, and diversity is achieved if for each band and each time interval, there is an analysis result sent by at least two terminals (a collaborating subset) at different locations from one another. In each successive time interval, the subset of terminals sensing and transmitting their analysis results for any particular band differs as compared to the previous time interval. A mobile station/terminal may do this in response to receiving an instruction designating it as a collaborating user, and that instruction may be received from a same node to which the first and second sensing results are transmitted, and that instruction may also be received with a seed number for a sequence generator. The first and second frequency bands may be pseudorandomly selected by indexing a series of frequency bands in the designated spectrum and executing an algorithm that pseudorandomly selects one of the indices for the first and second time intervals by use of a seed number and a pseudorandom sequence generator (e.g., by disposing the indices in a pseudorandom order). In an embodiment, the first and second frequency bands are independent of frequency bands at which a mobile station executing the method are authorized to transmit user data.

And in an embodiment of the invention from a central node or coordinating terminal's perspective, the node/terminal receives from N cognitive users first analysis results for frequency bands spanning a designated spectrum for a first time interval, and also receives from the N cognitive users second analysis results for frequency bands spanning the designated spectrum for a second time interval, wherein the analysis results for the first time interval for a first one of the frequency bands are from a different subset of the N cognitive users than the analysis results for the second time interval for the first one of the frequency bands. The analysis results may be test statistics, and the node then determines from the test statistics that it receives from the N cognitive users (which span the frequency bands across the designated spectrum) that a portion of the designated spectrum is unused or otherwise underutilized, and responsive to that determination causes a transmission to be sent over the determined unused or underutilized portion. The node receiving the test statistics may make that transmission itself or may instruct one or more of the N cognitive nodes that the unused spectrum is available for use, such as where the central node (such as a node B or an access point) also includes a scheduling function and the central node schedules one of the N cognitive nodes to transmit or receive on that unused spectrum. In this instance, unused spectrum is included within the term underutilized spectrum. The spectrum sensing continues beyond the first and second time interval, indefinitely or until the cognitive users are instructed to cease spectrum sensing. To assure the diversity noted above, for each of the frequency bands in both the first and second time intervals the central node/coordinating terminal receives an analysis result from at least two different ones of the N cognitive users. The instruction it sends could further include a seed number for use by the N cognitive users with a sequence generator, and the central node/coordinating terminal may specifically determine a number M from the N cognitive users in a system as M being an integer about equal to (e.g., rounded from) N/K, wherein K is a number of frequency bands in the designated spectrum and M is a number of the N cognitive users from which the first and second analysis results are received for one of the K frequency bands.

Figure 4:
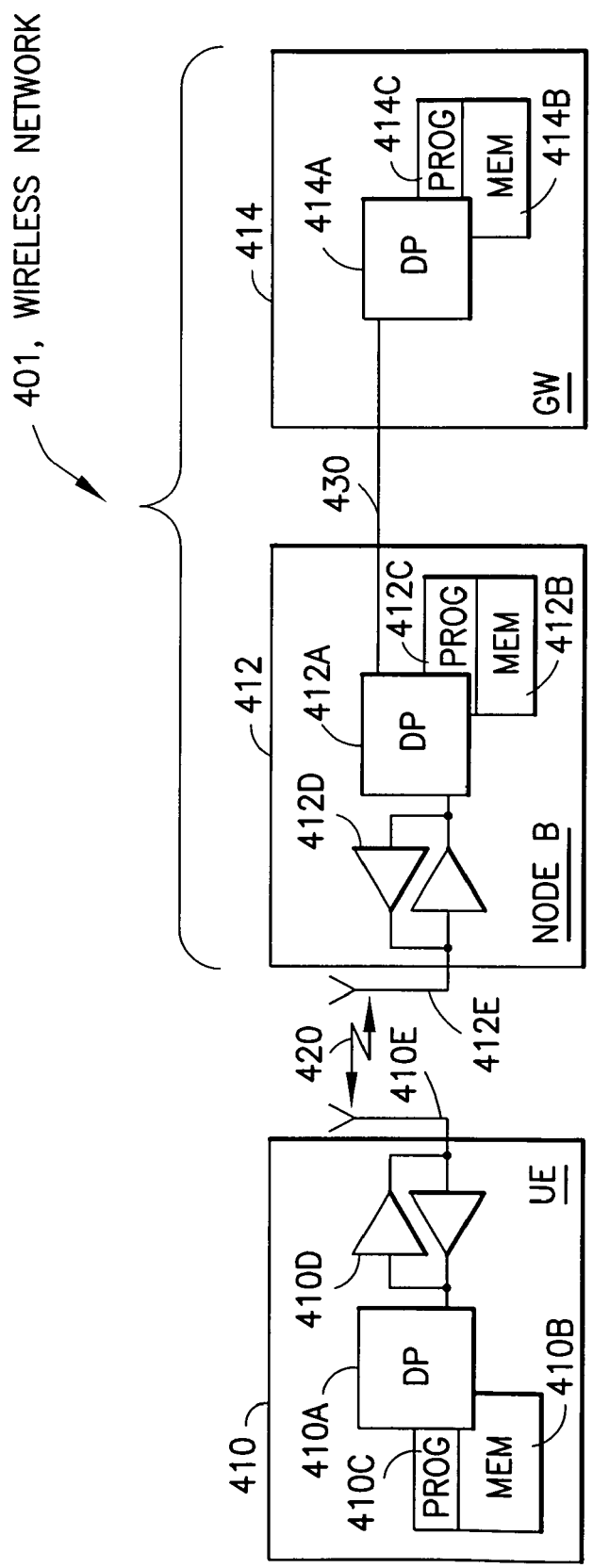
FIG. 4 is a simplified block diagram of various electronic devices that are suitable for use in practicing the exemplary embodiments of this invention.

Reference is now made to FIG. 4 for illustrating a simplified block diagram of various electronic devices that are suitable for use in practicing the exemplary embodiments of this invention. In FIG. 4 a (hierarchical) wireless network 401 is adapted for communication between a UE 410 and a Node B 412 (e-Node B/base station/central node). The network 401 may include a gateway GW/serving mobility management entity MME/radio network controller RNC 414 or other radio controller function known by various terms in different wireless communication systems. The UE 410 includes a data processor (DP) 410A, a memory (MEM) 410B that stores a program (PROG) 410C, and a suitable radio frequency (RF) transceiver 410D coupled to one or more antennas 410E (one shown) for bidirectional wireless communications over one or more wireless links 420 with the Node B 412.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled-"together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The Node B 412 also includes a DP 412A, a MEM 412B, that stores a PROG 412C, and a suitable RF transceiver 412D coupled to one or more antennas 412E. The Node B 12 may be coupled via a data path 430 (e.g., Iub or S1 interface) to the serving or other GW/MME/RNC 414. The GW/MME/RNC 414 includes a DP 414A, a MEM 414B that stores a PROG 414C, and a suitable modem and/or transceiver (not shown) for communication with the Node B 412 over the data link 430.

At least one of the PROGs 410C, 412C and 414C is assumed to include program instructions that, when executed by the associated DP, enable the electronic device to operate in accordance with the exemplary embodiments of this invention, as detailed above. Inherent in the DPs 410A, 412A, and 414A is a clock to enable synchronism among the various apparatus for transmissions and receptions within the appropriate time intervals and slots required.

The PROGs 410C, 412C, 414C may be embodied in software, firmware and/or hardware, as is appropriate. In general, the exemplary embodiments of this invention may be implemented by computer software stored in the MEM 410B and executable by the DP 410A of the UE 410 and similar for the other MEM 412B and DP 412A of the Node B 412, or by hardware, or by a combination of software and/or firmware and hardware in any or all of the devices shown. For example, the sequence generator may be a PROG stored in a MEM.

In general, the various embodiments of the UE 410 can include, but are not limited to, mobile terminals/stations, cellular telephones, personal digital assistants (PDAs) having wireless communication capabilities, portable computers (e.g., laptops) having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions and sensor networks.

The MEMs 410B, 412B and 414B may be of any type suitable to the local technical environment and may be implemented using any suitable data storage technology, such as semiconductor-based memory devices, magnetic memory devices and systems, optical memory devices and systems, fixed memory and removable memory. The DPs 410A, 412A and 414A may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software (computer readable instructions embodied on a computer readable medium), logic or any combination thereof. For example, some aspects such as the sequence generator may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation such as FIG. 3, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits ICs is by and large a highly automated process. Complex and powerful software tools are available for converting a logic level design into a semiconductor circuit design ready to be etched and formed on a semiconductor substrate. FIG. 3 may represent specific circuit functions of such an IC.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

We claim:

1. A method comprising:
pseudorandomly selecting from a designated spectrum a first frequency band in a first time interval;
determining a first analysis result by sensing the first frequency band during the first time interval;
transmitting the first analysis result;
pseudorandomly selecting from the designated spectrum a second frequency band in a second time interval;
determining a second analysis result by sensing the second frequency band during the second time interval; and
transmitting the second analysis result.

2. The method of claim 1, executed by a mobile station automatically in response to receiving an instruction designating the mobile station as a collaborating user.

3. The method of claim 1, wherein the instruction is received from a same node to which the first and second analysis results are transmitted.

4. The method of claim 1, wherein pseudorandomly selecting the first and second frequency band from the designated spectrum comprises indexing a series of frequency bands in the designated spectrum and executing an algorithm that pseudorandomly selects one of the indices for the first and second time intervals.

5. The method of claim 4, wherein the algorithm pseudorandomly selects one of the indices by a seed number and a pseudorandom sequence generator.

6. The method of claim 5, wherein the seed number is received with an instruction designating a mobile station executing the method as a collaborating user.

7. The method of claim 1, wherein sensing the first and second frequency band comprises using a cyclostationary feature detection algorithm or an energy detection algorithm or a likelihood ratio test or a filter matched to a known waveform to determine a test statistic.

8. The method of claim 1, wherein the first and second frequency bands are pseudorandomly selected independent of frequency bands at which a mobile station executing the method is authorized to transmit user data.

9. The method of claim 1, further comprising:
receiving from a plurality of terminals analysis results for the first time interval for a plurality of frequency bands that span the designated spectrum; and
receiving from the plurality of terminals analysis results for the second time interval for the plurality of frequency bands;
wherein for each of the frequency bands, the received analysis results for the first time interval are from a different subset of the plurality of terminals than the received analysis results for the second time interval.

10. The method of claim 1, wherein the first time interval comprises a first portion of a network defined transmission time interval, and the transmission time interval further comprises a second portion that is one of a communication portion or an acknowledgement portion.

11. The method of claim 1, further comprising:
receiving from a plurality of terminals analysis results for the first time interval for a plurality of frequency bands within the designated spectrum; and
receiving from the plurality of terminals analysis results for the second time interval for the plurality of frequency bands;
wherein for each of the frequency bands, the received analysis results for the first time interval are from a different subset of the plurality of terminals than the received analysis results for the second time interval.

12. An apparatus comprising:
a processor coupled to a memory and adapted to pseudorandomly select from a designated spectrum a first frequency band in a first time interval and a second frequency band in a second time interval;
a receiver adapted to sense the first frequency band during the first time interval and to sense the second frequency band during the second time interval;
in which the processor is further adapted to determine a first analysis result from the sensed first frequency band and to determine a second analysis result from the sensed second frequency band; and
a transmitter adapted to transmit the first analysis result and to transmit the second analysis result.

13. The apparatus of claim 12 in which the apparatus comprises a mobile station, wherein the processor is adapted, in response to receiving an instruction at the receiver that designates the mobile station as a collaborating user, to automatically pseudorandomly select the first frequency band in the first time interval and the second frequency band in the second time interval.

14. The apparatus of claim 12, wherein the instruction is received from a same node to which the transmitter transmits the first and second analysis results.

15. The apparatus of claim 12, wherein the processor is adapted to pseudorandomly select the first and the second frequency bands from the designated spectrum by indexing a series of frequency bands in the designated spectrum and executing an algorithm stored in the memory that pseudorandomly selects one of the indices for the first and the second time intervals.

16. The apparatus of claim 15, wherein the algorithm pseudorandomly selects one of the indices by a seed number and a pseudorandom sequence generator.

17. The apparatus of claim 16, wherein the seed number is received at the receiver with an instruction designating the device as a collaborating user.

18. The apparatus of claim 12, wherein the processor is adapted to determine the first and the second analysis results by executing a cyclostationary feature detection algorithm or an energy detection algorithm or a likelihood ratio test or a filter matched to a known waveform to determine a test statistic.

19. The apparatus of claim 12, wherein the first and the second frequency bands are pseudorandomly selected independent of frequency bands at which the device is authorized to transmit user data.

20. The apparatus of claim 12, wherein
the receiver is further adapted to receive from a plurality of terminals analysis results for the first time interval for a plurality of frequency bands that span the designated spectrum, and to receive from the plurality of terminals analysis results for the second time interval for the plurality of frequency bands,
wherein for each of the frequency bands, the received analysis results for the first time interval are from a different subset of the plurality of terminals than the received analysis results for the second time interval; and
the processor is further adapted to determine from the determined analysis results and from the received analysis results whether any of the frequency bands are unused.

21. The apparatus of claim 12, wherein the transmitter is adapted to transmit the first analysis result in a sensing portion of a network defined first transmission time interval and one of a communication and an acknowledgement in another portion of the first transmission time interval, and to transmit the second analysis result in a sensing portion of a network defined second transmission time interval and one of a communication and an acknowledgement in another portion of the second transmission time interval.

22. The apparatus of claim 12, wherein
the receiver is further adapted to receive from a plurality of terminals analysis results for the first time interval for a plurality of frequency bands within the designated spectrum, and to receive from the plurality of terminals analysis results for the second time interval for the plurality of frequency bands,
wherein for each of the frequency bands, the received analysis results for the first time interval are from a different subset of the plurality of terminals than the received analysis results for the second time interval; and
the processor is further adapted to determine from the determined analysis results and from the received analysis results whether any of the frequency bands are unused.

23. A computer readable memory embodying a program of machine-readable instructions executable by a digital data processor to perform actions directed toward determining time and frequency parameters for sensing spectrum bands, the actions comprising:
pseudorandomly selecting from a designated spectrum a first frequency band in a first time interval;
determining a first analysis result by sensing the first frequency band during the first time interval;
pseudorandomly selecting from the designated spectrum a second frequency band in a second time interval;
determining a second analysis result by sensing the second frequency band during the second time interval; and
transmitting the first analysis result and the second analysis result.

24. The computer readable memory of claim 23, in which the computer readable medium and the digital data processor are disposed within a mobile station, and in which the actions are executed automatically in response to receiving an instruction designating the mobile station as a collaborating user.

25. The computer readable memory of claim 23, wherein pseudorandomly selecting the first and second frequency band from the designated spectrum comprises indexing a series of frequency bands in the designated spectrum and executing an algorithm that pseudorandomly selects one of the indices for the first and second time intervals.

26. The computer readable memory of claim 25, wherein the algorithm pseudorandomly selects one of the indices by a seed number and a pseudorandom sequence generator.

27. The computer readable memory of claim 26, wherein the seed number is received with an instruction designating a mobile station executing the method as a collaborating user.

28. The computer readable memory of claim 23, wherein sensing the first and second frequency band comprises using a cyclostationary feature detection algorithm or an energy detection algorithm or a likelihood ratio test or a filter matched to a known waveform to determine a test statistic.

29. The computer readable memory of claim 23, wherein the first and second frequency bands are pseudorandomly selected independent of frequency bands at which a mobile station executing the method is authorized to transmit user data.

30. The computer readable memory of claim 23, further comprising:
receiving from a plurality of terminals analysis results for the first time interval for a plurality of frequency bands within the designated spectrum; and
receiving from the plurality of terminals analysis results for the second time interval for the plurality of frequency bands;
wherein for each of the frequency bands, the received analysis results for the first time interval are from a different subset of the plurality of terminals than the received analysis results for the second time interval.

31. The computer readable memory of claim 23, the actions further comprising:
receiving from a plurality of terminals analysis results for the first time interval for a plurality of frequency bands within the designated spectrum; and
receiving from the plurality of terminals analysis results for the second time interval for the plurality of frequency bands;
wherein for each of the frequency bands, the received analysis results for the first time interval are from a different subset of the plurality of terminals than the received analysis results for the second time interval.

* * * * *